(12) United States Patent
Toth

(10) Patent No.: US 6,372,346 B1
(45) Date of Patent: Apr. 16, 2002

(54) TOUGH-COATED HARD POWDERS AND SINTERED ARTICLES THEREOF

(75) Inventor: Richard Edmund Toth, Savannah, GA (US)

(73) Assignee: EnDurAloy Corporation, Savannah, GA (US)

(*) Notice: Subject to any disclaimer, the term of this patent is extended or adjusted under 35 U.S.C. 154(b) by 0 days.

(21) Appl. No.: 09/423,229
(22) PCT Filed: May 13, 1998
(86) PCT No.: PCT/US98/09767
§ 371 Date: Feb. 29, 2000
§ 102(e) Date: Feb. 29, 2000
(87) PCT Pub. No.: WO98/51419
PCT Pub. Date: Nov. 19, 1998

Related U.S. Application Data

(60) Provisional application No. 60/046,885, filed on May 13, 1997.

(51) Int. Cl.$^7$ .............................. B32B 5/16; B32B 9/00; B22F 1/02; B22F 3/00
(52) U.S. Cl. ....................... 428/403; 428/325; 428/328; 428/329; 428/404; 428/698; 428/699; 428/702
(58) Field of Search ................................. 428/402, 403, 428/404, 406, 325, 328, 329, 698, 699, 701

(56) References Cited

U.S. PATENT DOCUMENTS

| | | |
|---|---|---|
| 4,399,167 A | 8/1983 | Pipkin |
| 5,062,865 A | 11/1991 | Chen et al. |
| 5,167,943 A | 12/1992 | Kuo et al. |
| 5,211,726 A | 5/1993 | Slutz et al. |
| 5,232,469 A | 8/1993 | McEachron et al. |
| 5,250,086 A | 10/1993 | McEachron et al. |
| 5,352,522 A | 10/1994 | Kugimiya et al. |
| 5,453,293 A | 9/1995 | Beane et al. |
| 5,489,449 A | 2/1996 | Umeya et al. |
| 5,601,924 A | 2/1997 | Beane et al. |
| 5,614,320 A | 3/1997 | Beane et al. |
| 5,682,595 A | 10/1997 | Gonseth et al. |
| 5,820,721 A | 10/1998 | Beane et al. |

Primary Examiner—Deborah Jones
Assistant Examiner—Jennifer McNeil
(74) Attorney, Agent, or Firm—Finnegan, Henderson, Farabow, Garrett & Dunner, L.L.P.

(57) ABSTRACT

A sintered material and the powder to make such a material is comprised of core particles that consist essentially of a first metal compound having the formula $M_aX_b$. M is a metal selected from the group consisting of titanium, zirconium, hafnium, vanadium, niobium, tantalum, chromium, molybdenum, tungsten, aluminum, boron and silicon while X is an element selected from the group consisting of nitrogen, carbon, boron and oxygen. The letters a and b represent numbers greater than zero up to and including four. The core particles are surrounded by an intermediate layer consisting essentially of a second metal compound, different in composition from the first metal compound thereby forming coated particles. The material of the intermediate layer has a higher relative fracture toughness than the material comprising the core particles and is capable of bonding with the metal compound(s) forming the core particles and also being capable of bonding with iron, cobalt or nickel. The coated particles are surrounded by an outer layer of iron, cobalt, nickel, their alloys, their mixtures and their intermetallic compounds.

43 Claims, 5 Drawing Sheets

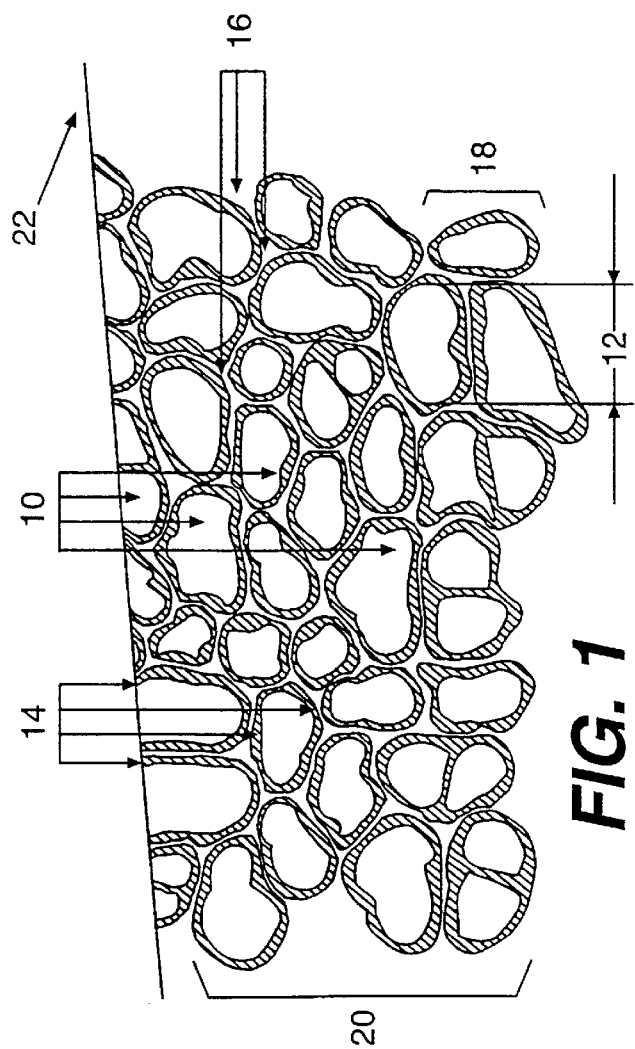
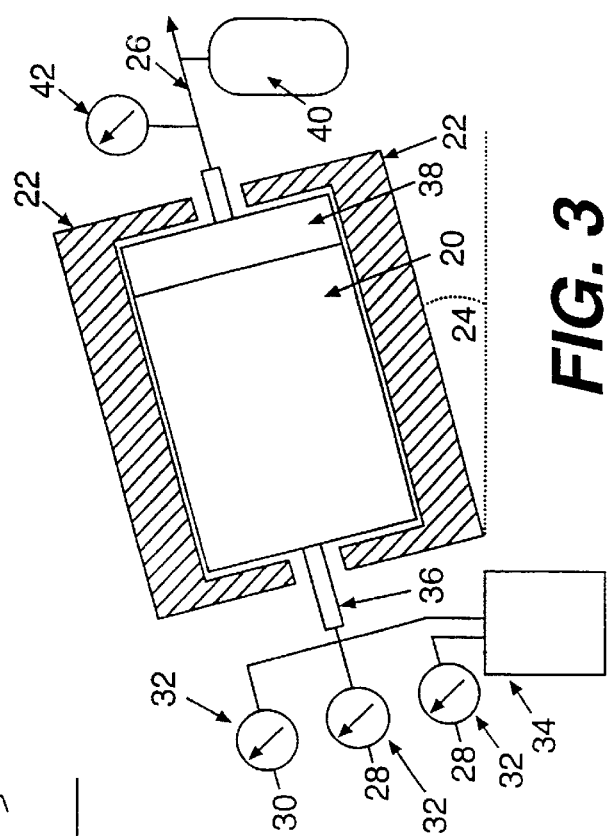

| SAMPLE NO. | A | B | C | D | E | F | G |
|---|---|---|---|---|---|---|---|
| CHARACTERISTICS & DESCRIPTION | REFERENCE EC.3CO DISCS Ø 10mm SINTERED UNDER VACUUM AT 1450°C | REFERENCE WC/TI/MO/CO BAR SINTERED UNDER VACUUM AT 1450°C | COATED TiN POWDER 16 NT E29 DISCS Ø 10mm SINTERED UNDER VACUUM AT 1450°C | COATED TiN POWDER 16NT E29 DISCS Ø 10mm SINTERED UNDER VACUUM AT 1450°C | COATED TiN POWDER 10COTE36 DISCS Ø 50mm SINTERED BY HOT PRESSING AT 1400°C, 200 kg/cm2 | COATED TiN POWDER 16COTE36 DISCS Ø 50mm SINTERED BY HOT PRESSING AT 1400°C, 200 kg/cm2 | SANDVIK TOOL COATED W/TiC, TiN, Al2O3 MAT'L GC 415 (P15) STYLE SNUN 120408 |
| DENSITY IN G/cm3 (% OF THEORETICAL DENSITY) | 14.5 (=97%) MEASURED ON SAMPLE PRODUCED AT M3D | 12.6 (=95%) MEASURED ON SAMPLE PRODUCED AT M3D | 5.18 (=90%) | 4.82 (=83%) | 6.06 (=100%) | 6.33 (=100%) | 14.9 (=100%) |
| HARDNESS (Hv) | 33 HRA=1760 Hv (FROM ASM HANDBOOK AND COMMERCIAL DATA FROM SANDVIK) (2047 Hv MEASURED AT M3D IS PROBABLY TOO OPTIMISTIC) | 1386 Hv (MEASURED ON SAMPLE PRODUCED AT M3D) | 1160 | 645 | 1400 (CORE OF SAMPLE) | 1400 (CORE OF SAMPLE) | -1750 |
| FRICTION COEFFICIENT (BALL-ON-DISC FRICTION MACHINE, LOW ALLOYED STEEL BALL, NO LUBRICANT) | 0.088 (MEASURED ON SAMPLE PRODUCED AT M3D) | 0.12 (MEASURED ON SAMPLE PRODUCED AT M3D) | 0.037 | 0.058 | 0.035 | 0.034 | -0.1 |
| BENDING STRENGTH (MPa) | 1790 MPa (FROM ASM HANDBOOK) | NO MEASUREMENT | NO MEASUREMENT | NO MEASUREMENT | 400.4 (STD. DEV.=54.16) | 436.4 (STD. DEV.=51.99) | -1790 |
| ELASTIC MODULUS (GPa) | 641 GPa (FROM ASM HANDBOOK) | NO MEASUREMENT | NO MEASUREMENT | NO MEASUREMENT | 245.6 (STD. DEV.=21.92) | 299 (STD. DEV.=12.29) | -640 |
| FLANK WEAR, mm (AVG)* | 0.19 | NO MEASUREMENT | NO MEASUREMENT | NO MEASUREMENT | 0.315 | 0.21 | 0.16 |
| CRATER WEAR, mm² | 0.0125 | NO MEASUREMENT | NO MEASUREMENT | NO MEASUREMENT | 0.0072 | 0.0084 | 0.01 |
| PERCENTAGE OF HARD PHASE MATERIAL | 94 wt% WC | 87 wt% WC | 10.4 wt% W2C 84 wt% TiN + W2C | 10.4 wt% W2C 84 wt% TiN + W2C | 12 wt% W2C 90 wt% TiN + W2C | 11.2 wt% W2C 90 wt% TiN + W2C | 94 wt% WC |
| BINDER CONTENT (wt%) | 6 | 6 | 16 | 16 | 10 | 16 | 6 |
| ESTIMATED THICKNESS OF TiCHP COATING (BASED ON CALCULATION AND OBSERVATIONS) | NO COATING | NO COATING | =0.16μm | =0.16μm | =0.16μm | =0.16μm | -5μm (ON TOOL) |

FIG. 7

TOUGH-COATED HARD POWDERS AND SINTERED ARTICLES THEREOF

CROSS REFERENCE TO RELATED APPLICATION

The present application is based on a provisional application Ser. No. 60/046,885 filed May 13, 1997.

BACKGROUND OF THE INVENTION

1. Field of the Invention

The present invention relates to ceramic powders and sintered materials made from such powders. Such materials find particular utility as metal forming members such as metal cutting and forming tools.

2. Background of the Invention

During the mid-1930's, tool steel alloys began to be replaced by sintered tungsten carbide powder tools, which quickly became the standard because of their excellent hardness and inherent high toughness and transverse mechanical strength. The hardness of such materials improved tool life, and the toughness and strength helped increase productivity by allowing higher feeds, speeds, and more aggressive forging parameters. Carbide tool development and commercial availability increased significantly after World War II.

Even these materials eventually wear, and the mechanisms of such wear are not as yet fully understood. Progressive wear causes variation in the materials being shaped, and as a result of the need to hold part dimensional tolerances, the tool must be replaced when it is no longer able to form the part to the correct dimension. The time or number of parts formed before such an occurrence ultimately determines the limit of the tool's life. The resulting productivity loss during tool change out and process readjustment, non-conforming production, rework, and missed schedules have been a driving force for obtaining materials that provide longer tool life.

Tool life is determined by its resistance to several types of wear, its response to heavy loads, and to shock. In general, the higher the chip removal rate (high feeds and speeds), drawing and forming pressures, and the longer tool geometry is retained, the better the tool. Superior cutting and forming tools must be simultaneously hard, strong, stiff, and resistant to chipping, fracture, heat breakdown, fatigue, chemical reaction with the work piece, and attrition wear. Accordingly, the dominant desirable mechanical properties sought in a sintered tool are strength, hardness, high elastic modulus, fracture toughness, low chemical interaction with the work piece, and low coefficient of friction to aid work piece forming while reducing heat buildup.

In recent years, the powder metallurgy (PM) industry has increased significantly because of the ability of powders to flow cold into a precision mold. This allows the mold to be reused, often at high volume, while dramatically reducing machining, forming, and other process steps because the sintered part is already very close to its intended configuration, or "near net shape." Increasingly these parts, now produced principally of aluminum, ferrous, and copper powders, require some of the same desirable attributes as tools. For this reason, many PM articles undergo additional forging, plating, or heat treatment operations to develop localized hardness, toughness, and strength. Many of these parts require resistance to shock and abrasion that call upon the same mechanical properties as are required for tools.

In tools and hard articles, wear resistance is increased at the expense of strength; today, the best tools exhibit the best compromises, and therefore are limited for use in special applications.

Beyond tungsten carbide, various alloys, coating techniques, and combinations of both have been found to permit not only longer tool life but also increased cutting speeds and feeds. Powder metallurgy and sintering have lead to the development of new materials with enhanced hardness and toughness, and adding a hard coating to the sintered alloy such as by chemical vapor deposition (CVD), physical vapor deposition (PVD), or plasma-assisted chemical vapor deposition (PACVD) has increased wear resistance.

Much is taught in the prior art about preparation of coatings on powders, coating substrates, and other hard material enhancements. The prior art of tool materials teaches six approaches that are currently known and in general use for the achievement of such enhanced wear resistance and toughness; each having significant benefits and significant drawbacks: (1) mixing hard and tough phase particles, (2) chemical vapor deposition (or other) coating of sintered substrates with hard phase layers, (3) combining approaches one and two, (4) cermetallic (cermet) compacts, (5) for a special type of tool (grinding and sanding media), chemically bonding low concentrations of large diamond or cBN particles into a hard but relatively weak abrasive substrate, and (6) Functionally Gradient Materials (FGM).

None of these solutions has brought about the essential combination of desired tool properties, and only the chemical vapor deposition (CVD or PVD) approach is today applicable for some mechanical parts requiring increased abrasion resistance.

Mixing Hard and Tough Ternary Systems.

In spite of the many ancillary treatments and variations that exist and that are taught in the art, mixing hard WC-TiN-Co alloy particles with the carbide powder before sintering has several disadvantages. Because these harder particles have low mutual solubility with the binder, substrate transverse strength drops quickly above 6–10 wt. percent hard particles. Surface hardness and wear resistance are accordingly reduced also, compared with a surface coating. The wear mechanism is also not greatly enhanced because the few hard particles (less than one in ten at the surface where needed), weakly bound to the binder, break away whole.

Chemical Vapor Deposited (CVD) Coatings.

These hard external coatings of hard intermetallic and cermet layers on tool steels or sintered article substrates (after sintering) are valued for the high surface hardness they impart, typically exhibiting values of 2400 Vickers (TiN) to 5000 Vickers (cubic boron nitride) to 9000 (diamond). Yet, for all the ancillary treatments, variations, and sintering aids that exist and are disclosed in the art, including additional coating layers, locally altered substrate structures, and grain-size reducing dopants or coatings, the external coating solution has several major disadvantages, including coating delamination and cracking in use (from different coating and substrate thermal expansion rates and from bending and surface loads) and the high CVD process temperatures required (900° C.–1200° C.) may not be consistent with the heat-treatment needed for the strength or the geometry of the sintered part.

Conventional CVD coating of already-sintered articles with several different coatings or layers allows them to resist two or three unique work piece challenges. But since each layer must be deposited sequentially the remaining one or two special coatings must remain covered until the outer layers have worn away. Therefore, only one of the concurrent substrate coating design challenges can be met at the same time.

Some categories of tools, such as drawing dies and nozzles, are even more prohibitively expensive because there is an additional cost to assure the CVD vapor is adequately circulated through the die orifice for the deposition of a coating, where it is most needed. Diffusion of the CVD gas is slow and penetration is typically 0.5 to 10 micrometers or less. First, at these thicknesses, the coating is worn through to the underlying carbide before most of the wire or tube diameter tolerance is used up. Second, the normal reutilization of the dies at larger diameters must be done without the hard coating. In many cases, tool total life prolongation may not be proportional to the added CVD cost.

Today, external coatings are the most common commercial solution to enhancing the performance of plain sintered tungsten carbide products. Increasing the deposition thickness of outer layers to gain greater life has diminishing returns; it tends to increase the propensity for cracking and to round off sharp tool edges, adversely affecting optimal cutting or die geometry.

Combined Mixes and Coatings.

CVD coating and mixing hard alloy particles, a combination of (1) and (2) above gives very limited added benefit while having the same drawbacks.

Cermets.

Cermets are ceramic particles dispersed in a metal oxide or carbide matrix. Cermets combine the high-temperature resistance of ceramics with the toughness and ductility of carbides. They are priced about the same as plain tungsten carbide, and wear is about the same, except for light finishing cuts, where it outperforms plain carbide.

Sintered Abrasive Composites.

The fourth approach, taught in Dr. Randall M. German's book, *Liquid Phase Sintering*, Plenum Press, New York 1985 (and practiced in Russia many years earlier) creates a class of super abrasive composites for grinding and sanding media and niche application tools.

Such composites are produced by mixing diamond particles (or cubic boron nitride, cBN) and cobalt powders or capturing them in a metal (nickel) electroplate deposit and hot pressing these at lower temperatures. An alternative is to coat the diamond (or cBN) with an intermediate layer of a transition metal carbide former (which wets the diamond) and chemically bonds it to others with a low melting point nonwetting but ductile metal binder such as cobalt, iron, or nickel. The transition metal is applied solely as a chemical bridge in thicknesses not intended to bear structural mechanical load. The metals used as the principal binder matrix have good sinterability but relatively low melting points, elastic moduli, and strengths. Such materials have desirable properties in abrasive applications. In most of these applications the diamond represents 10 to 60 vol. percent of the composite. The binder coatings are several micrometers thick, to aid processing at low temperatures (to avoid graphitic degradation of the diamond) and dilute the diamond content, but with great sacrifice in mechanical properties. The properties of these composites are governed by chemical considerations, not mechanical considerations of elastic modulus, strength, or fracture toughness. Accordingly, with the large diamond particle size and large binder concentration, the mechanical properties of the composite are determined by the rule of mixtures. The compositions are selected to ensure the diamond particles are separated in the final microstructure, assuring there can be little diamond-diamond interaction. There is little amplification of mechanical advantage as is found in the one micrometer to nanoscale grain size range of sintered carbides.

The requirements for grinding tools are relatively large grains (50 to 600 micrometers) to increase metal removal, bonding these particles to a wheel, adequate spacing between particles (low concentration of particles with large binder phase ligaments) to permit removal of work piece particles, and long retention of grinding wheel geometry. Such materials form metals by wearing away the work piece by the sheer differential in hardness between the abrasive particles and the work piece itself. Such abrasive composites are sometimes used in cutting tools used in machining specialty high hardness materials at relatively high speed but very low chip removal (load) rates. (See FIG. 6). The cutting action of diamond cutting tools is very different from that of cemented carbide tools. The limitation of diamonds or composites in cutting tools stems from their cutting behavior. Such composites operate as abrasives, where they generally perform by wearing away the work piece, rather than by removing chips under heavy load. In this mode, the very hard diamond particle is retained by a tensile bond. While sliding across the work piece, the diamond becomes exposed to cut the opposing surface, but it resists wear while the matrix erodes and progressively exposes the diamond. It is the protruding diamond that performs cutting as long as its remains sharp. When the diamond dulls, it becomes rounded and the matrix is designed to fail. In this manner the diamond is pulled out by the work piece and the matrix erodes until another diamond is exposed.

Such hard, brittle abrasive composites are also used in some tool-like applications such as masonry bits and saws. They are also found in high cost wire drawing dies, and some cutting tools where their performance is permitted by presence of steel or other strong backing.

Functionally Gradient Materials (FGM).

The problem with coated articles is the incompatibility between mechanical, chemical, or thermal properties of the layers. To correct this problem by providing a gradual transition between incompatible layers, FGM's have one or more of the following variables: chemical composition, microstructure, density, or variable forms of the same material. Another purpose is as a coating to modify the electrical, thermal, chemical or optical properties of the substrate upon which the FGM is applied. The principal disadvantages of such materials is their tendency to fail at locations where the properties change and the difficulty in manufacturing such materials.

SUMMARY OF THE INVENTION

The principal objective of the present invention is to create sinterable particulate materials called Tough Coated Hard Powders (TCHPs) that provide increased value over hard article and tool materials known today. The particles and articles made therefrom combine the best mechanical properties of strength, hardness, high elastic modulus, fracture toughness, low interaction with the work piece, and low coefficient of friction that exist separately in conventional materials into an article of unmatched properties.

It is a further object of the invention to reduce the cost of providing such materials to users. For example, tool inserts must be provided in considerable geometric variation to fit into the various toolholders. Moreover, the tool materials available today must be designed for very specific applications. Therefore, for each of these geometric variants, material choices (uncoated, CVD coated, PVD coated, cermet, ceramic, polycrystalline cBN, polycrystalline diamond) must also be offered. The combination of geometric and material variations requires expensive catalogs, needless tool manufacturing redundancy, costly supplier and user inventories with unique packaging and identification, and sales effort to explain and sell the confusing array to users. Another object of the present invention is to reduce the waste and cost associated with the present system by providing more general purpose, higher-performance tools at reasonable cost.

In addition, the process of making the product embodiments of the invention has the object of reducing the cost of production of articles made in accordance with the invention.

Another object is to provide significant cost reduction by extending the first-time article life and by decreased manufacturing cost of the products they touch. The fact that the articles of the present invention are macroscopically homogeneous, rather than coated, offers users or suppliers the opportunity of economically regrinding and reusing the initially worn articles.

Yet another object of the invention is to provide the same high performance mechanical properties of the materials of the present invention to other hard article applications.

Another objective of the present invention is to provide a material having enhanced wear resistance and toughness for use in a broad array of articles including tooling (such as drawing dies, extrusion dies, forging dies, cutting and stamping dies, forms, forming rollers, injection molds, shears, drills, milling and lathe cutters, saws, hobs, broaches, reamers, taps and dies); individual mechanical parts (such as gears, cams, journals, nozzles, seals, valve seats, pump impellers, capstans, sheaves, bearing and wear surfaces); integrated co-sintered components to replace mating parts (internal combustion engine connecting rods, bearings) and/or to provide hard surface zones in powdered metal (P/M) mechanical parts substituted for forged or machined steel parts with heat treated zones (such as camshafts, transmission parts, printer/copier parts); heavy industrial articles (such as deep well drilling bits, teeth for mining and earthmoving equipment, hot rolls for steel mills); and electromechanical components (such as memory drive reading heads, specialized magnets). In addition to providing such novel articles, principal objectives of the invention are to provide novel composite particulate materials (i.e., TCHP's), novel methods for producing such materials, and novel methods for fabricating articles from such materials.

To achieve these and other objects there is provided a sintered material comprising a plurality of core particles that consist essentially of a first metal compound having the formula $M_aX_b$. M is a metal selected from the group consisting of titanium, zirconium, hafnium, vanadium, niobium, tantalum, chromium, molybdenum, tungsten, aluminum and silicon. X represents one or more elements selected from the group consisting of nitrogen, carbon, boron and oxygen and a and b are numbers greater than zero up to and including four. An intermediate layer surrounds each of the core particles and consists essentially of a second metal compound, different in composition from said first metal compound. The second metal compound has a higher relative fracture toughness and is capable of bonding with the first metal compound and also is capable of bonding with iron, cobalt or nickel. The core particle with the intermediate layer thereon forms a number of coated particles. An outer layer overlays the intermediate layer on the coated particles and functions as a binder. It is comprised of iron, cobalt, nickel, their mixtures, their alloys or their intermetallic compounds.

Preferably the coated particles have an average particle size less than about 2 $\mu$m and most preferably less than about 1 $\mu$m. It is also preferred that the intermediate layer have a thickness, after sintering, in the range of from 5% to 25% of the diameter of the core particles. It is also preferred that the outer layer have a thickness after sintering in the range of from 3% to 12% of the diameter of the coated particles. It is believed that with such a thickness of the outer layer that strain fields associated with dislocations in one coated particle are transmitted through the outer binder layer to the immediately adjacent intermediate layer. Preferably the first metal compound consists essentially of a stoichiometric compound such as TiN, TiCN, TiB$_2$ TiC, ZrC, ZrN, VC, VN, cBN, Al$_2$O$_3$, Si$_3$N$_4$ or AlN. It is also preferred that the second metal compound consist essentially of WC or W$_2$C, and most preferably WC. Such materials have a fracture toughness greater than cubic boron nitride.

A preferred embodiment of a sintered material comprises a plurality of core particles consisting essentially of cubic boron nitride with an intermediate layer on each of said core particles said layer consisting essentially of WC. The intermediate layer has a thickness, after sintering, in the range of from 5% to 25% of the diameter of the core particles. An outer layer comprising cobalt or nickel overlays the intermediate layer and that outer layer has a thickness after sintering in the range of from 3% to 12% of the diameter of the coated particles. The combination of the core particles, intermediate layer and outer layer forming a coated particle, preferably having an average particle size less than about 1 $\mu$m.

Another embodiment of the present invention is a powder consisting essentially of a plurality of coated particles. The majority of the coated particles have core particles consisting essentially of a first metal compound having the formula $M_aX_b$. M is a metal selected from the group consisting of titanium, zirconium, hafnium, vanadium, niobium, tantalum, chromium, molybdenum, tungsten, aluminum and silicon. X represents one or more elements selected from the group consisting of nitrogen, carbon, boron and oxygen and a and b are numbers greater than zero up to and including four. The core particles coated with a surrounding layer consisting essentially of a second metal compound, different in composition from said first metal compound and having a higher relative fracture toughness. The layer also is capable of bonding with the first metal compound and also capable of bonding with a metal selected from the group consisting of iron, cobalt and nickel. Preferably the coated particles have an average particle size of less than about 2 $\mu$m and most preferably less than about 1 $\mu$m. It is also preferred that the layer surrounding the core particles after sintering have a thickness in the range of from 3% to 200% of the diameter of the core particles.

The preferred compositions of the core particles and surrounding layer (the intermediate layer) are the same for the powder embodiment as for the sintered article.

It is also preferred that the outer binder layer consist essentially of cobalt, nickel, iron, their mixtures, their alloys or their intermetallic compounds deposited on the outer surface of the second metal compound layer in the form of a continuous layer.

BRIEF DESCRIPTION OF THE DRAWINGS

The accompanying drawings are included to provide a further understanding of the invention and are incorporated in and constitute a part of this specification, and together with the description serve to explain the principles of the invention.

FIG. 1 is a schematic representation of a sintered material formed in accordance with one aspect of the present invention.

FIG. 3 is a schematic representation of a device for forming the powders in accordance with one aspect of the present invention.

FIG. 7 is a compilation of the properties of the sintered materials described in the Examples.

DESCRIPTION OF THE PREFERRED EMBODIMENTS

Figure 2:
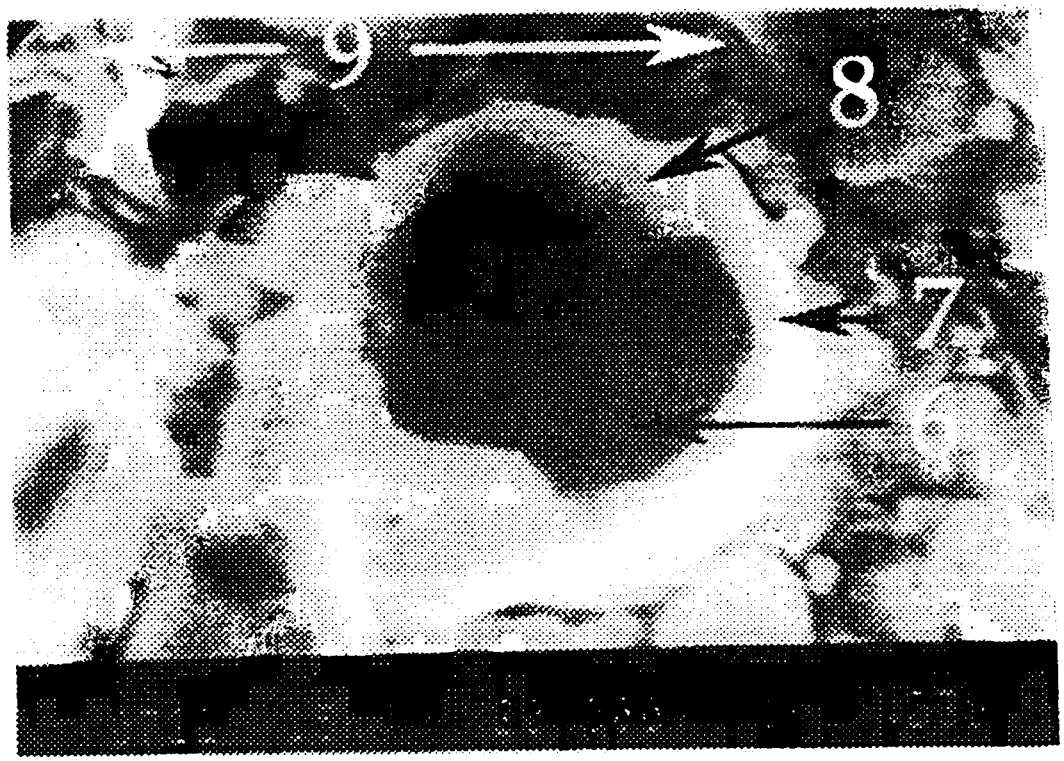
FIG. 2 is a scanning electron microscope photomicrograph of a cross-section of a sintered material formed in accordance with one aspect of the present invention at a magnification of 20,000×.

As here embodied, the present invention is a new type of material formed from powders. In accordance with the invention the powder is comprised of a plurality of core particles. The core particles are intended to impart their physical properties to the overall powder structure. As here embodied, the core particles consist essentially of a first metal compound having the formula $M_aX_b$, where M is a metal selected from the group consisting of titanium, zirconium, hafnium, vanadium, niobium, tantalum, chromium, molybdenum, tungsten, aluminum, and silicon and X represents one or more elements selected from the group consisting of nitrogen, carbon, boron, and oxygen, and the letters (a) and (b) represent numbers greater than zero and up to four. Such metal compounds are hard, wear resistant, and chemically resistant to most environments and workpieces. Significantly, for the present invention the core material may be exposed, as for example, where the powder is sintered to form a cutting tool, the sintered article is formed by grinding, lapping, and polishing to form the final article shape. This removes the intermediate layer of material over the core particles and exposes the core of the particles to the work piece being machined. As will be more fully disclosed below, this is a significant advantage.

As here embodied, the core particles of the powders consist essentially of at least one stoichiometric compound. In some embodiments the core compositions are different to impart the properties of the various core particles to the articles being formed therefrom. It is preferred that the metal compound of the core consist essentially of a metal compound selected from the group consisting of: TiN, TiCN, $TiB_2$, TiC, ZrC, ZrN, VC, VN, cBN, $Al_2O_3$, $Si_6N_4$ and AlN. Such materials can be used in the form of commercially available powders, whiskers, crystals, filaments, or the like, as the shape of the core particle can be technically significant. The core particle is covered with a layer of another metal compound termed the intermediate layer. Thus, the material of the core particle must have a degree of compatibility with the material forming the intermediate layer applied thereto and should have a composition different than that of the intermediate layer.

The powder embodiment of the present invention includes an intermediate layer applied to the exterior surface of the core particle. The intermediate layer consists essentially of a second metal compound, i.e., one different in composition from the first metal compound forming the core of the particle. The compound of the second, intermediate, layer has a higher relative fracture toughness than the material forming the core. In addition, the second metal compound must be capable of bonding with the first metal compound and be capable of bonding with iron, cobalt, nickel, their mixtures, their alloys or their intermetallic compounds. Preferably the second metal compound consists essentially of WC or $W_2C$. As will be disclosed below, the combination of a relatively tough and strong intermediate layer and a hard core provide a powder and a sintered material formed therefrom with exceptional mechanical properties. This is also the case with the size and layer thicknesses of the coated particles. Specifically, the particle sizes and layer thicknesses provide properties that are not accounted for by classical rule of mixture calculations. This will be more fully described in the portion of the specification dealing with the sintered articles. In any event, it is preferred that the coated particles have an average particle size of less than about 2 $\mu$m and most preferably less than about 1 $\mu$m. It is also preferred that the intermediate layer have a thickness in the range of from 5% to 25% of the diameter of the core particles.

The thickness of the intermediate layer has a significant effect on the mechanical properties of the articles made therefrom. It is believed that when the coated particles (the core with an intermediate layer thereon) have an average particle diameter as measured graphically in a photomicrograph of a cross-section using the mean free path method of less than about 2 $\mu$m, the resistance to dislocation movement within adjacent sintered particles is enhanced, improving the mechanical properties of the sintered article. Even using a classic mechanical approach, using finite element analysis, it is apparent that increasing the thickness of a spherical shell WC surrounding a TiN sphere from about 0.1 $\mu$m to about 0.4 $\mu$m increases the theoretical toughness over 40%.

It is further preferred that the intermediate layer have a thickness, before sintering, in the range of from 3% to 200% of the diameter of the core particles. During sintering there may be a reduction of the thickness of the intermediated layer due to interaction with the core material, particle/particle interaction, grain boundary and growth phenomena. Thus, to achieve the desired thickness of the intermediate layer in the final sintered article it may be necessary to have the initial thickness be as high as 300% of the diameter of the core particle.

A preferred form of the powder would have an outer binder layer applied thereto. Conventionally, metal binders are applied to the metal compound particles by milling them with metal powders. This physical operation is long and when only a minor percentage of the powders being milled (e.g., 6%) are of the binder metal, the time to smear the binder metal on the surface of the remaining 94% of the particles adversely affects the economics of forming sintered articles using metal binders and may damage the coated particles. The present invention contemplates applying such particles as a uniform coating on the exterior of the metal compound particles in the form of a continuous layer. In accordance with the invention, the binder layer consists essentially of a metal selected from the group consisting of: iron, cobalt, nickel, their mixtures, their alloys and their intermetallic compounds. Preferably the continuous layer of binder is deposited by chemical vapor deposition, sputtering, electroless plating, electroplating, physical vapor deposition, carbonyl deposition, solution spray deposition, or plasma assisted physical vapor deposition. Because cobalt and nickel are compatible with the preferred species of core particle material and the preferred materials for the intermediate layer and have superior high temperature properties, they are the preferred binder metal compositions.

Another embodiment of the present invention is a sintered material. Such a sintered material is comprised of a plurality of core particles consisting essentially of a first metal compound having the formula $M_aX_b$. M is a metal selected from the group consisting of titanium, zirconium, hafnium, vanadium, niobium, tantalum, chromium, molybdenum, tungsten, boron, aluminum and silicon. X represents one or more elements selected from the group consisting of nitrogen, carbon, boron and oxygen and a and b are numbers greater than zero up to and including four.

Preferably, the first metal compound is predominantly stoichiometric and consists essentially of a metal compound selected from the group consisting of: TiN, TiCN, $TiB_2$, TiC, ZrC, ZrN, VC, VN, cubic BN, $Al_2O_3$, $Si_3N_4$ and AlN. Such metal compounds are hard, and have certain other useful mechanical properties, but have limited fracture toughness (the ability to arrest a propagating crack). Other metal compounds may be operable with the present invention, however, the previously listed compounds are preferred.

The selection of the compositions for the different portions of the particles can be based on conventional information as to the known characteristics of candidate materials on the macro level. For example, it is known that diffusion wear can be estimated for various materials by considering their standard free energy of formation at the operating temperature. Taken in order, WC, TiC, TiN, and Al2O3 have increasingly negative energies of formation; therefore, TiN is seen to provide a significantly reduced diffusion wear in comparison with standard WC cermets.

Moreover, the rates of dissolution of various tool materials into iron (the typical work piece), at temperatures ranging from 1000–1100° C., differ strongly from one another. A comparison shows that a significant TiN presence on the tool surface will ensure a strong decrease of WC dissolution into iron; at 500° C., for example, the relative dissolution rates are:

WC: $5.4 \times 10^4$

TiC: 1.0

TiN: $1.8 \times 10^{-3}$

Al2O3: $8.9 \times 10^{-11}$

These principles are believed to explain the improvements in wear behavior of WC tools against iron, when the WC is associated with a TiN core; i.e., the exposed TiN core will present a lower diffusion wear into iron than WC. A WC continuous particle coating is believed to be necessary to achieve a strong shell and high mechanical properties (Young's modulus of 696 GPa, compared to a value of 250 GPa for TiN). The TiN core (having a Vickers hardness of Hv=2400 compared to a value of Hv=2350 for WC, and having a sliding coefficient of friction $\mu$=0.125 compared to a value of $\mu$=0.200 for WC) will reduce friction wear against iron; the core will be exposed to the surface of the tool after its finish grinding and polishing.

It is also possible to have the core particles be a plurality of different metal compounds as long as each are compatible and different from the material comprising the layer covering the core particles. In this way, the properties of an article comprised of the sintered material, when the core particles are exposed by removing a portion of the covering intermediate layer, are determined principally by the properties of the core particle, their concentration in the sintered material, and their combinations. For example, if it is desired to form the sintered article into a cutting insert the sintered article could be ground or shaped by EDM (electro discharge machining) to expose the core particles. In a preferred embodiment where the core particles are TiN and the intermediate layer is WC, the coefficient of friction of the TiN, its hardness, and resistance to wear impart those properties to the cutting insert while the overall strength of the insert and its resistance to crack propagation are enhanced by the WC layer surrounding the TiN core particles. Significantly, wear of the insert will not result in the diminution of the characteristics of such an insert because the TiN is not a coating to be worn off. It is an integral part of the insert material that renews the surface as it is worn. A preferred core material is cubic boron nitride (cBN), however, this embodiment requires specific size and thickness of particles and layers to realize the potential of the cBN core particle. It is believed that the extraordinary hardness of the cBN must be integrated into the article by use of a load-bearing surrounding layer of another metal compound of a composition and thickness such that the resulting layered particle, when sintered, will have useful engineering properties as a structure above its use as an abrasive.

This embodiment of the sintered material includes an intermediate layer on each of the cBN core particles that consists essentially of WC or $W_2C$.

This embodiment further includes an outer layer overlaying the intermediate layer on the coated particles. The function of the outer layer is to form a binder and join the coated particles at reasonable sintering times and temperatures into a dense sintered material. As here embodied the outer layer functions as a binder. It is comprised of iron, cobalt, nickel, their mixtures, their alloys or their intermetallic compounds. As noted above with respect to the powder embodiment the present invention contemplates applying such binders as a uniform coating on the exterior of the metal compound particles in the form of a continuous layer.

The size of the core particles covered with the intermediate layer (together referred to as "the coated particles") has a significant effect on the mechanical properties of the sintered material and the articles made therefrom. As noted above in the disclosure relating to the powder, it is preferred that the coated particles have an average particle size less than about 2 $\mu$m and preferably less than about 1 $\mu$m. It is also preferred that the intermediate layer have a thickness, after sintering, in the range of from 5% to 25% of the diameter of the core particles. Moreover it is believed that the thickness of the binder layer also affects the properties of the sintered material.

It is preferred that the outer binder layer have a thickness after sintering in the range of from 3% to 12% of the diameter of said coated particles.

A sintered material having such dimensions is believed to have improved properties because strain fields associated with dislocations in one coated particle are transmitted through the intermediate layer to the immediately adjacent core particle. The invention is known to be operable with the intermediate layer having a thickness, after sintering, in the range of from 3% to 200% of the diameter of the core particles, however, a thickness in the range of from 5% to 25% is preferred.

It is known that increased toughness is the normal result of decreasing grain size. The preferred core particle diameter is in the 0.1 nanometer to 1.0 micrometer range. This range of particle sizes interacts with the thickness of the intermediate layer.

The strength of a crystalline substance depends on atomic bonding and the dislocation structure. Dislocations are linear atomic lattice defects that are normally pinned and immobile. In a mixture of two atomically bonded crystalline materials, there are upper and lower bound estimates to the elastic modulus of the composite as calculated by the rule of mixtures and the inverse rule of mixtures. Subjected to increasing load, the material deforms elastically until the dislocations in the grains begin to flow or slip, leading to the onset of permanent yielding and the limit of useful strength. At particle sizes of approximately one micrometer and below, exceptionally high strengths develop in such materials, due mainly to image dislocation stresses.

There is a cylindrical strain field around each dislocation that extends outward into the surrounding lattice. Theoretically, this strain field around each dislocation must be balanced by opposing strain fields, otherwise the dislocation will move away from surfaces. When the crystal size is large compared to its strain field, no image stress is created around a dislocation unless it is at the crystal surface. In a sintered material having a binder joining a plurality of crystalline particles, the image stress matches the lower strength of the binder matrix, but for large crystals this is a trivial correction since most dislocations are not near a surface.

In submicrometer polycrystalline particles, the strain field may extend into neighboring grains, whose atomic lattice is probably not aligned with that of the strain field grain. This balancing strain field outside the grain surface restrains movement of the dislocation, thus restraining yielding. As the size of the grains diminishes further, more dislocations are near surfaces and the strength can decrease.

It is believed that when the thickness of the intermediate layer and the binder layer connecting the coated particles into a sintered material are thin enough, then the strain field actually passes through the binder matrix and into neighboring particles. This creates a high strength that is ignorant of the ligament material (in this case binder) between hard coated particles. In other words, the mechanical properties of the sintered article are independent of the properties of the binder phase, assuming it is crystalline and very thin.

The thickness of the intermediate layer should also be thick enough relative to the core in order to create a mechanical cellular support matrix throughout and around the core particles. Beyond this objective and the expected image stress strength increase with 1.0 micrometer and smaller core powders, surprising strength properties may be realized in the sintered TCHP alloys, apparently due to the interplay of the particle size, the properties of the core material, and the properties and thicknesses of the intermediate layer and the binder.

The reason for this is not yet fully understood, but a tungsten carbide (WC) coating of 5 to 10 percent of a 1.0 micrometer or smaller core particle is actually very thin, and may act as if it were itself a much smaller, tough phase particle (50 to 100 nanometers), effectively attaining nanoscale mechanical properties at significantly larger and more manageable particle sizes.

The TCHP structure with small hard core particle size and tough, nanoscale shells separated by thin cobalt ligaments below one micrometer between grains, maximizes elasticity, hardness, fracture toughness, and strength. Most interesting is the possible loss of the "composite" character in sintered TCHP mechanical properties due to the thin binder ligaments. Even with a low hardness material (such as cobalt) the image stresses from dislocations near the surface (and all are near surfaces with submicrometer grains), the composite properties are higher than possible in abrasive composites. It may also be that as the binder matrix ligaments become very thin and the strength of the composite becomes independent of the plastic properties of the cobalt binder, the structural strength of the cellular coatings may predominate and actually approach that of WC.

The present invention provides sinterable metal particulate materials that can be engineered to afford an optimum balance of properties (e.g., toughness, strength, low frictional coefficient, and hardness). The operating improvements that can be expected in dies and other tooling fabricated from TCHP's are threefold: (a) a lower friction coefficient at the interface between the work piece and tool, yielding reduced heat, wear, and cratering, and requiring less processing power and auxiliary use of external lubricants, ultimately resulting in longer tool life and better process control; (b) a low reactivity with iron, reducing sticking and diffusion, flank, or die wear, and in turn extending the service life of the drawing die; and (c) a sintered tool microstructure in which the tough, strong coating material (e.g., WC) on the particles forms a cellular support macrostructure for the tool while, at the same time, providing a perfectly-fitting and tightly-bound protective layer for the hard particulate cores (of, for example, TiN), holding them in position and permitting optimal exposure and hard phase retention at the wear-resistant tool surface.

This is in contrast to articles produced by conventional methods (wherein the relatively low binder strength that exists between the particles and the binder lowers the level of toughness and bending strength), or in which a sintered article is wholly coated to impart hardness (wherein the thin coating has limited life or cracks).

Placing the hard-phase alloys inside, as the core particle (instead of at the outside), distributes hard-phase alloys (exposed at the external surfaces after finish grinding) throughout the sintered microstructure in much greater proportions (or thicknesses) than is possible in any known conventional material. This in itself increases wear resistance, reduces chemical interaction with the work piece, and lowers coefficient of friction significantly. Tool life is enhanced by the constant renewal of surface grains that wear or are pulled away by the opposing sliding surface.

Also, the wear resistance and adhesion characteristics of most of the preferred core materials are known from their performance in conventional materials, so their performance as core particle materials is, in light of the present disclosure, predictable. Because the core particles are coated with known materials (e.g., WC) blending and sintering together coated particles having several different core materials will facilitate enhancement of multiple characteristics. Accordingly, the cost of development and testing are reduced while providing a final material with unique properties. Thus designing a sintered microstructure where each particle has a tough shell (the intermediate layer) that adheres very strongly to its neighbor particles to form a tough cellular support system throughout the sintered article substrate, produces a sintered article with the highest possible combination of strength, high elastic modulus, fracture toughness, and hard alloy content.

The resultant article macrostructure is a cellular microstructure framework composed of tough, strong, tightly interbonded coated particle shells, each containing and supporting one or more mechanically and chemically-bonded core particles, crystals, fibers, or whiskers, exposed in cross-section at the external surfaces during finish grinding and polishing. This principle of optimizing the combination of different materials for the core particles and the surrounding intermediate layer allows the combination of normally conflicting article performance characteristics (e.g., strength and hardness) at levels heretofore unseen in the powder metallurgical art.

This concept gives a material designer multiple tools (used singly or in combination) and a straightforward method providing easy and total control in adapting the TCHP particle structure (intermediate layer thickness, size, and core materials) and mix (integrating different powders into tool and article zones) to meet many different unique, combined, and specialty demand conditions with a single article or tool.

Moreover, using a standard strong material (such as WC) as a tough outer particle shell dramatically reduces the research, development and industrialization effort because only one material reaction precursor gas (for example, tungsten carbide) will have to be used to coat the powder particles, instead of the many dozens of complicated precursor and reactant gases used in multiple external substrate coatings. Such particulate materials will sinter as if made of tungsten carbide particles, which are already known to bond very strongly to neighboring tungsten carbide particles with a binder such as cobalt. Thus, the standard tough material in use for over sixty years will permeate and strengthen the entire structure. Increasing the tungsten carbide coating thickness on the particle to meet more challenging strength applications or decreasing it in more critical wear applications should solve most design challenges. Increasing the core particle size can readily be accomplished to meet more severe requirements for wear resistance or decreasing it for higher strength applications. Using different core particle materials with characteristics (hardness, coefficient of friction) known or found to perform better in specific applications (such as for flank wear or crater wear) is also accomplished by selection of the core material. It is also possible to blend the above thickness, diameter, and core material powder parameters to solve most multiple criteria applications.

It is also possible to transition TCHP's gradually from zones or layers rich in harder phases to those with more tough intermediate layer materials using preheated extruded wax/powder sections. This is a more flexible and effective approach than that used in Functionally Gradient Material (FGM) currently being used.

The present invention can also be used to integrate different powder layers (or blends) in different portions of the same part to better resist multiple performance challenges. This is the ultimate degree of microstructure design refinement that is possible, short of an atomic-level gradient. Co-sintered with other metal powders to give localized hardening in "nonhard" sintered parts, the TCHP will allow steel parts requiring heat treatment to be substituted with powdered metal (P/M) parts, requiring fewer manufacturing operations.

Turning now in detail to the appended drawings, FIG. 1 depicts a sintered material in schematic cross-section. In this embodiment there are one or more hard metal compound particles (10) with a hard, tough metal compound intermediate layer (14) such as tungsten carbide. The coated particle includes an outer layer of a suitable sintering binder (16), preferably of the iron group metals, typically cobalt or nickel. The resultant coated powder (18) is finally sintered into a semifinished or finished article, a microsection of which is generally designated by the numeral 20.

The microstructure of the sintered article (20) is a cellular framework of strongly interbonded unitary WC layer (14), each containing and supporting its own tightly-bonded metal compound core (10), held within the matrix (16) and exposed in cross-section at the external surfaces (22) during finish grinding and polishing.

The scanning electron microscope photograph shown in FIG. 2 is of a unitary TCHP particle consisting of a 1.6 micrometer core particle (6) of titanium nitride coated (7) with a thickness of approximately 0.25 micrometers (15 percent) of $W_2C$. It is one of many TCHP grains placed in a resin metallurgical sample, shown in the background (9) and lapped. It is well known that hard alloy particles often do not sinter close enough to theoretical density, owing (a) to the irregularity of such grains (causing poor flowability, necessitating hot pressing) and (b) to low plastic deformation during consolidation.

The figure-eight shape of the core particle (6) showed concave irregularities typical in the samples. The CVD coating process typically filled in the concavities as at (8), giving the coated particles a rounder, smoother shape that in fact aided flowability and densification of the powders. This should reduce processing cost, result in a more uniform and thin binder layer, and aid densification of the powders, which in turn will enhance the mechanical properties of the sintered article.

Figure 5:
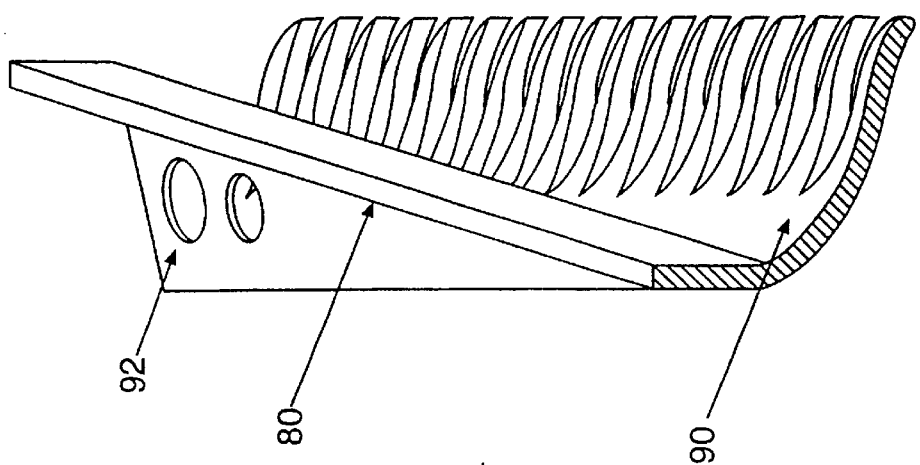
FIG. 5 is an end view of one component in a preferred embodiment of the device of FIGS. 3 and 4.
Figure 4:
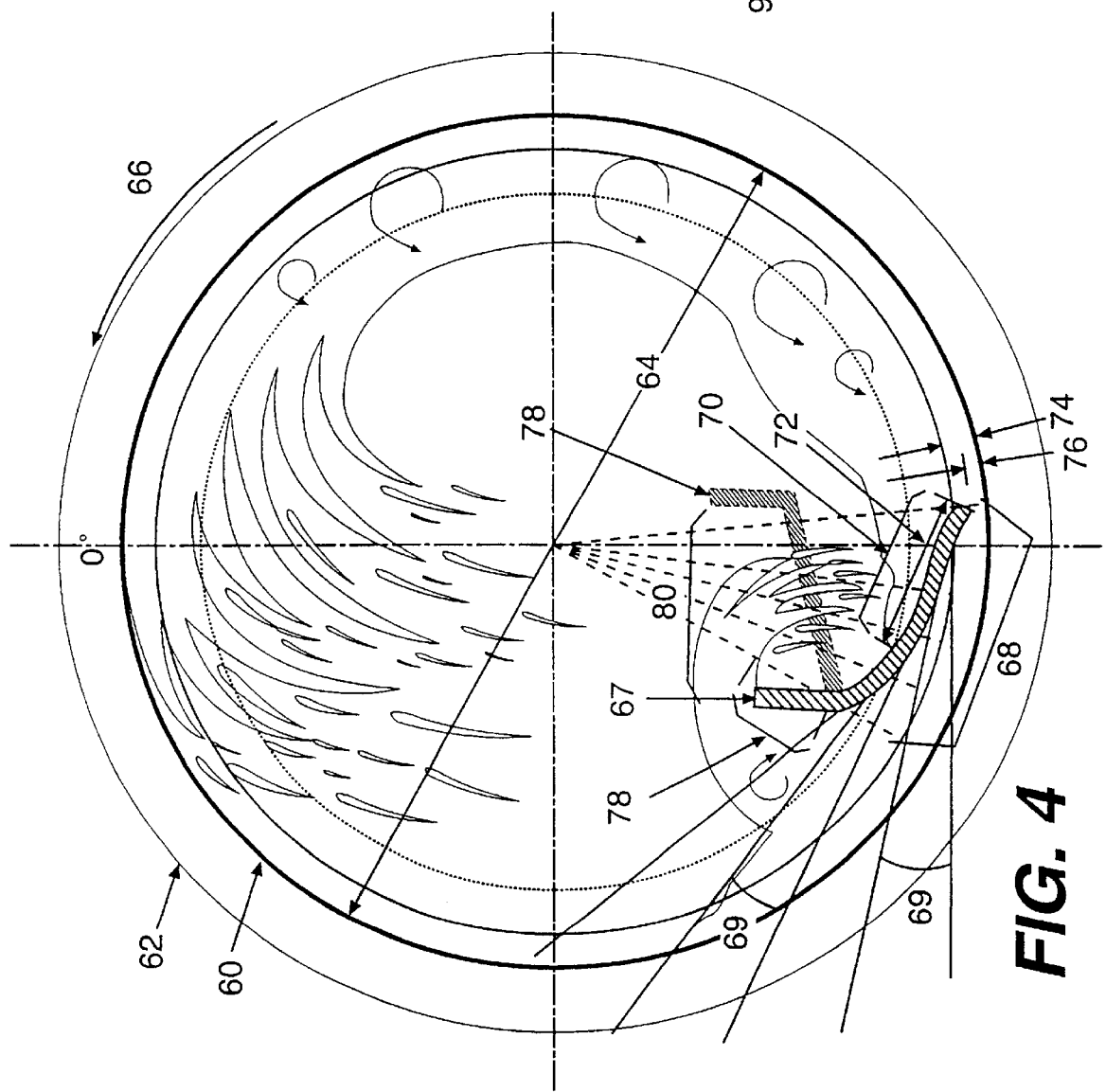
FIG. 4 is a schematic representation of the interior of the device of FIG. 3 depicting the movement of particles within such a device during deposition of the intermediate layer by chemical vapor deposition.

The unique powders of the present invention were made in a chemical vapor deposition (CVD) reactor. Because the size of the particles being coated, the reactor included components to prevent agglomeration of the particles being coated. A schematic depiction of the reactor is depicted in FIGS. 3–5.

The CVD reactor system of FIG. 3 consists of a rotating CVD reactor vessel (20), contained within a furnace (22) for heating the powder and reactant gases, which gases are delivered to the reactor and evacuated via gas inlet and outlet conduits (36, 26), respectively, at its opposite ends. Line (30) supplies the tungsten hexaflouride ($WF_6$) precursor, while lines (28) supplying the 99.999 percent purity hydrogen, these being the two gases which react in the reactor vessel (20) to form the CVD coating, connect to the rotating seal and inlet conduit (36) through flow meters (32). Line (28) also passes through a gas bubbler (34), containing 99.9 percent purity isopropyl benzene. A filter (38) is interposed at the outlet side of the reactor (20), ahead of the evacuation conduit (26), which conduit is operatively connected to a vacuum system (not shown) and a trap device (40) and flow gauge (42). The reactor (20) may take the form of a refractory metal or graphite cylinder, which is capable of rotation at a variable speed, in the range 50 to 150 rpm depending on the drum diameter and specific gravity of the powder being coated, and of variation of its orientation; thus, the angle of tilt (24) and the speed of revolution can be adjusted to provide the proper residence time for the coated powder within the high temperature (500–1600° C.) reactive gaseous environment produced.

There are four significant challenges in practicing the CVD method in producing submicron TCHP particulate matter: (1) the current cost of the tungsten hexaflouride ($WF_6$) precursor gas, (2) controlling the noxious characteristics of $WF_6$, (3) premature reaction of the precursors on surfaces other than on the core powder, and (4) breaking up the agglomerates. The latter three have technical solutions. Although other processing cost advantages may offset the first challenge, the ultimate success of CVD will be determined by its cost relative to the other methods, such as deposition using metal carbonyl.

The solution to the third challenge (inefficient use of reactants) above was found to be to maintain the gas below the reaction threshold temperature until it is proximate to the core particles. This may be further improved by keeping the reactant gases separated, mixing them by and with the turbulent heated powders themselves.

It was found that microwave energy (but not induction frequencies) would heat the particles. At a frequency of 2.45 Ghz heating for about 2 minutes a 500 watts produced about 37–40° C. temperature rise. The concept of high heating rates in a focused, turbulent flow of reactants heated by the powder itself (heated by microwave energy) in a recirculating quartz tube has high appeal in achieving homogeneous deagglomeration, mixing, recirculation, and coating of submicron powders.

FIG. 4 illustrates one solution found to solve the problem of agglomeration of the powder. The fluidization in a rotating reactor normally does not apply the forces required to break up the lumps, which continually reform. In fact, left unchecked, the agglomerates tend to classify themselves according to size, further hindering homogeneous processing. Additionally, a conventional horizontal reactor has end zones that reduce the homogeneity of the coating thickness in the batch. As depicted in FIG. 4, a solution of the problem of agglomeration and end zones that produced nonuniform coating involved tilting the reactor and installing a fixed comb-like guide 80 to (a) recirculate and homogenize the batch, and (b) to apply sufficient shear to the powder to deagglomerate it.

Inside the furnace, the reaction chamber (62) is constructed of graphite, lined (60) with a quartz cylinder. The rotation speed (66) must be such that gravity force acting on the core powder is just greater than the centrifugal force, so that the falling powder grains, thus fluidized to maximize exposure to the reactant gases, accumulate the intermediate coating thereon. The objective is to flow, roll, cascade, and tumble the core powder by the right combination of centrifugal force, gravity, and rotational inertia from the rotation of the cylinder to maximize the exposure of the powder to the precursor gases. This implies a practical diameter (64) of larger than 120 mm. To assist in breaking up the agglomerate lumps that prevent deposition of homogeneous layers on each particle, reagent gases may be introduced at a high flow rate through the falling powder to break the agglomerates with a shear force.

Shear is doubly applied to the powder in two zones of the guide (80), shown in cross section (67) at the lower end of the drum. The first zone (68) applies light pressure and shear to part of the powder as it is entrained beneath the guide by the rotating drum (60, 62). A progressive squeeze angle (69) of 13 degrees is formed between the drum and the rack (67), which angle applies sufficient compressive shear to break the agglomerates. The second zone (70), consists of long (72), angular teeth forming the rack itself, cut squarely, with little blending at the edges, into the stainless steel. This zone (70) allows the compressing powder to escape under a light shear force that serves to further deagglomerate and homogenize the particles for exposure during the next rotation. At a distance (74) of 5 mm from the quartz liner (60), the progressive angle of the rack teeth is terminated with a point of inflection that increases the squeeze just as the openings of the teeth (72) reach their maximum. A small clearance (76) of 0.5–1.0 mm protects the quartz from being scored by the rack.

The helicoidal zone (80) of the rack provides a guide (78), shown at the lower end of the reactor, (and shown at its upper end in dotted lines). This helical guide provides lift to the powder to assure lateral recirculation and batch homogeneity.

FIG. 5 depicts the helicoidal rack so that the helical guide (80) is shown more clearly. Holes (92) are cut into the upper platform to allow powder collected there to fall through for recirculation. The teeth of the rack (90) are also shown more clearly.

As presently contemplated, the preferred embodiment of the invention employs previously-milled particle core powders comprised of titanium nitride. This powder is CVD-coated with an intermediate layer of tungsten carbide. The use of a cobalt binder for sintering is preferred. In a TiN/WC/Co system, there is a good solubility of W in Co and efficient reaction between C and TiN, to form Ti (C,N), leading to a strong TiN/WC grain boundary phase and excellent mechanical properties in the sintered article, albeit that the bond is less strong than that which can be formed between W and Co.

The TiN phase is localized inside the material, and no decrease of performance arises from surface wear (as with traditional tools protected with a ceramic coating). Therefore, the dies, tools, or other hard articles made with such TCHP's could be reutilized for larger diameters, or reground for other applications. If it is later determined that the formation of Ti (C,N) interlayers must be minimized to increase binder effectiveness, increasing WC coating thickness and reducing sintering time and temperature via vapor deposition of binder layers on the particles can be employed. On the other hand, at a Vickers hardness of Hv=3200, Ti (C,N) is significantly harder than TiN at Hv=2400 or TiC at Hv=2800. This may prove to be an asset in some applications. Zirconium Nitride, ZrN, harder than TiN, has a coefficient of friction two-thirds less than that of TiN, and is considered better in flank wear. This is also a preferred core material.

Figure 6:
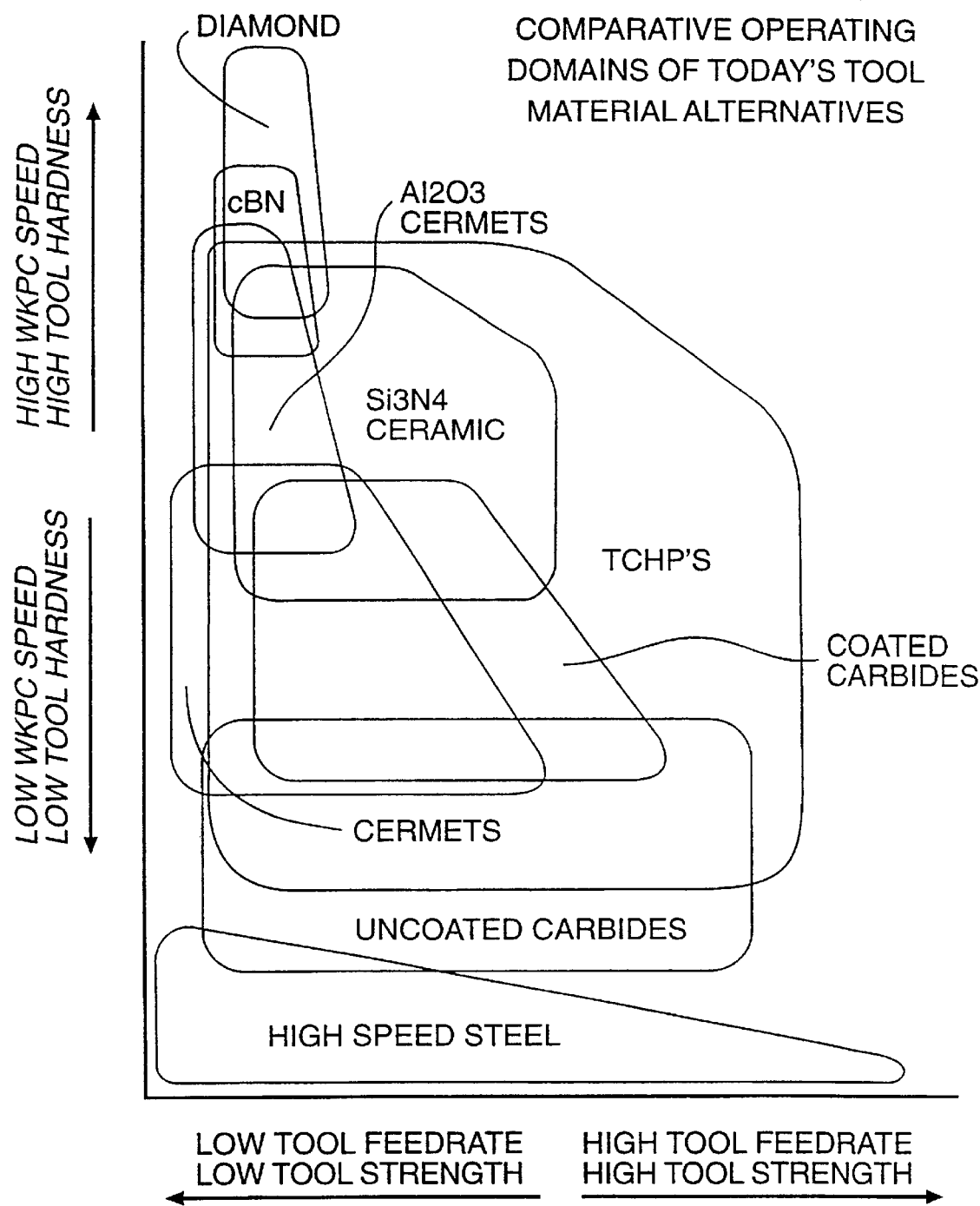
FIG. 6 is a graphical representation of the operating domain of the sintered material of the present invention, when used as a cutting tool, in relation conventional materials.

FIG. 6 depicts a compilation of the operating domains of a number of conventional tool materials and the expected operation domain of an embodiment of the present invention used as a cutting tool material. By using conventional hard materials as the core, reducing the particle size to the desired range and applying a tough coating (such as WC) in an appropriate thickness to the core, the TCHPs of the present invention broaden the operational domains of such conventional materials. The extent of the increase in the tool feedrate, i.e., the limit of the right side of the area defining the operating domain of the TCHPs of the present invention is based on the increased toughness provided by the tough coating and utilization of the hardness and other properties of the core material.

Using a reactor system such as that depicted in FIG. 3, sinterable composite particulate materials embodying the present invention could be prepared using each of the following alloys in the form of a 1.0–1.5 micrometer diameter powder: titanium nitride, titanium carbide, zirconium nitride, vanadium carbide, aluminum oxide, and cubic boron nitride. (Other alloys such as titanium diboride, zirconium carbide, tantalum nitride, and niobium carbide could also be used.) The reactive ingredients of the chemical vapor, employed for deposition of WCx, are tungsten hexaflouride (WF$_6$) in the presence of hydrogen and an aliphatic or aromatic carbonaceous compound, which ingredients react at temperatures in the range of 500° C. to 700° C. to form WCx coatings with highly reproducible characteristics. A low pressure in the reactor (e.g., less than 100 millibar) would be employed to increase the diffusivity of the reactive species in the gas and to allow a homogeneous coating on the surface of the powder. This technique is commonly called LPCVD (Low Pressure Chemical Vapor Deposition). The reactor is operated at a speed sufficient to tumble the core powder in a perpetual free-falling avalanche, and the velocity of the reactive gas is adjusted as a function of other parameters (pressure and total flow rate); a gas bubbler is used in those instances in which an aromatic liquid compound is employed as a reactive ingredient.

The target coating thicknesses, based on a desired 90–95 percent strength of an all WCx sintered carbide, and based on minimizing CVD residence time, is in the range of 2 to 25 percent of the average particle diameter. The CVD operating parameters are adjusted using a computer program, thereby permitting their optimization following the principal "indicator," e.g., the WCx coating thickness in different points of the reactor. The amount of WCx deposited on the powder is estimated by an EDX microanalysis of the treated powder in comparing the intensity peaks of tungsten and titanium, and the ratio WM: TiK (where M and K are the atomic ratio coefficients), determined on particle samples taken at different points in the furnace and at different times. This provides indications of the homogeneity, rate of deposition, and WCx surface and WCx/core particle interface characteristics, before sintering. The cross-sectional thickness of the WCx coating is observed with an optical microscope and a scanning electron microscope, using a specimen comprised of the TCHP grains embedded in a resin and polished to expose a section of the grains; X-Ray analysis is also used to show the presence of the WCx phase on the powder.

EXAMPLES

Three series of sintered samples were prepared: a series made with the WCx-coated titanium nitride particulate material (embodying the present invention, formulations C, D, E and F), a series of reference bars made with a tungsten carbide powder without any coating (Formulation A), a comparative series made with a mixture of uncoated tungsten carbide powder and an addition of a TiN (Formulation B), and a standard Sandvik material, (see column G in FIG. 7) coated with TiN, TiC, and $Al_2O_3$ (Formulation G).

Tungsten carbide (WC) powder employed in producing the formulations is commercially available from H.C. Starck Company, as grade DS100 and has a typical average particle size of about 1.0 $\mu$m ($\pm$0.1 $\mu$m). The cobalt powder utilized was Starck grade II, having a typical particle size of 1.5 $\mu$m ($\pm$0.2 $\mu$m); the titanium nitride powder employed is Starck grade C, having a typical particle size of 1.0 $\mu$m (ranging between 0.8 to 1.2 $\mu$m); and the nickel powder utilized is commercially available having a typical particle size of 2.2 $\mu$m.

The formulations that embody the present invention were comprised of TiN core grains CVD coated with tungsten carbide ($W_2C$) to a thickness of about 0.16 $\mu$m forming a composite particulate material (TCHP) having a particle size of about 1.0 $\mu$m. The apparatus hereinabove described with reference to FIGS. 3 through 5 was employed to effect CVD coating of the TiN powder. It is operated with a 20° helix angle and with the comb fixed at a 13° squeeze angle. A suitable amount of TiN powder was introduced into the chamber of the graphite reactor. The system was purged, hydrogen flow initiated, and the internal pressure adjusted to 11.25 Torr. Power was then supplied to the electric furnace to bring the drum of the reactor, rotating at 90 revolutions per minute, to a temperature of about 550° C. (about one hour). The flow meters for the $WF_6$ supply and the cumene bubbler were then opened to provide a molar ratio of the reactants suitable for the deposit of $W_2C$ on the TiN substrate powder; the bubbler operated at 20° C., and hydrogen gas is used as the carrier for the liquid cumene. Operation was continued for a period of time sufficient to produce the desired thickness of $W_2C$ on the TiN particles, after which the $WF_6$ flow meter and the cumene bubbler were closed and the furnace was cooled under hydrogen.

Formulation A is a binary mixture consisting of 94 weight percent WC and 6 weight percent Co; formulation B is a ternary mixture consisting of 87 weight percent WC, 6 weight percent Co, and 7 weight percent TiN; formulation C consists of 84 weight percent of the TCHP composite described and 16 weight percent Ni; formulation D consists of 84 weight percent of the TCHP composite and 16 weight percent Co; and formulation E consists of 90 weight percent of the TCHP composite and 10 weight percent Co.

Formulation B was formed into a sintered bar, measuring 53×16×11 mm and weighing about 130 grams, by admixing the formulation with Acrawax C (an ethylene bistearamide processing aid available from Lonza Inc., of Fair Lawn, N.J.) and hexane. It was ball milled for 16 hours with WC balls, dried under vacuum, sieved at 300 $\mu$m, cold isostatically pressed at 2000 bars for five minutes, and sintered, with a 20 minute dwell at 1450° C., under a vacuum of 1 to 3 Torr. The heating and cooling rates applied were 150 to 200° C. per hour and the total sintering operation required about two hours.

Sample discs were prepared from formulations A, C, D, E and F. To do so the formulation was admixed with a camphor temporary binder and an alcohol solvent, planetary milled for five minutes with tungsten carbide milling balls, dried at 80° C. for 15 minutes, and sieved at 300 $\mu$m. For Samples A, C and D, the discs formed are 10 mm in diameter and are sintered under the vacuum conditions described above for Samples A and B. To produce Samples E and F the milled, dried, and sieved formulation is subjected to uniaxial pressing at 1400° C. under a pressure of 200 $kg/cm^2$ to form discs measuring 50 mm in diameter.

A number of samples of each of the sintered articles hereinabove described were tested to evaluate each of several properties. The formulation, sintering condition (vacuum or hot pressing), form of the article (bar or disc), post-sintering binder content, and the values for the several measured properties are set forth in FIG. 7. The measurement of flank wear and crater wear were on a standard material (CK 45) at a tangential surface speed of 200 m/min, a 2 mm depth of cut and a feed rate of 0.2 mm/rev. The hardness, bending strength, and elastic modulus values for Sample No. 1 are from the literature. In the foregoing examples, the sintered samples embodying the present invention are found to function in a manner that establishes the constituent metal powder to be especially well suited for the fabrication of tooling and other articles, as contemplated herein.

It will be appreciated that the ability to vary not only the composition of the metals employed in producing the sinterable particulate materials of the invention (including any supplemental bonding agent or sintering aid), but also the relative thicknesses of the core particle and the surrounding intermediate enables a high degree of control to be exercised over the properties that are exhibited by the particulate materials and by the articles fabricated from them. For example, by varying the thickness of the shell (e.g., to a value that typically, but not necessarily, represents 5, 10, or 15 percent of the diameter of the TCHP particle), an optimal balance of hardness, toughness, strength, wearability, and heat transfer capacity can be achieved and imparted to the sintered product.

The present invention provides a new class of powdered materials, i.e., tough-coated hard powders (TCHP's) producing sintered articles that exceed the present compromised level of performance of conventional materials by combining the inherent transverse mechanical strength of the metal carbides (or comparable tough metallic compounds) with the superior wear resistance of hard metallic compounds at the core particle level. Tools or articles fabricated from such materials perform well in far broader ranges of conditions than today's specialized methods allow, and their performance/price, or value ratio, should increase significantly.

The present invention has been disclosed in terms of examples and preferred embodiments. The scope of the invention is not limited thereto but is defined by the appended claims and their equivalents.

What is claimed is:

1. A sintered material comprising:
   a plurality of core particles, said core particles consisting essentially of a first metal compound having the formula $M_aX_b$, where M is a metal selected from the group consisting of titanium, zirconium, hafnium, vanadium, niobium, tantalum, chromium, molybdenum, tungsten, aluminum, and silicon, X represents one or more elements selected from the group consisting of nitrogen, carbon, boron, and oxygen, and a and b are numbers greater than zero up to and including four,
   an intermediate layer on each of said core particles, said layer consisting essentially of a second metal compound, different in composition from said first metal compound and having a higher relative fracture toughness, said second metal compound being capable of bonding with said first metal compound and being capable of bonding with a metal selected from the group consisting of iron, cobalt, and nickel, thereby forming coated particles; and
   a binder overlaying said intermediate layer on said coated particles, said binder comprising at least one of iron, cobalt, nickel, their mixtures, their alloys, or their intermetallic compounds.

2. The sintered material of claim 1, said coated particles having an average particle size less than about 2 $\mu$m.

3. The sintered material of claim 1, said coated particles having an average particle size less than about 1 $\mu$m.

4. The sintered material of claim 1, said intermediate layer having a thickness, after sintering, in the range of from 5% to 25% of the diameter of said core particles.

5. The sintered material of claim 1, said intermediate layer having a thickness such that strain fields associated with dislocations in one coated particle are transmitted through said intermediate layer to the immediately adjacent core particle.

6. The sintered material of claim 1, said intermediate layer having a thickness, after sintering, in the range of from 3% to 200% of the diameter of said core particles.

7. The sintered material of claim 1, said outer layer having a thickness after sintering in the range of from 3% to 12% of the diameter of said coated particles.

8. The sintered material of claim 1, said binder having a thickness such that strain fields associated with dislocations in one coated particle are transmitted through said binder to the immediately adjacent intermediate layer.

9. The sintered material of claim 1, wherein the said first metal compound consists essentially of a stoichiometric compound.

10. The sintered material of claim 1, wherein the said first metal compound consists essentially of a metal compound selected from the group consisting of: TiN, TiCN, $TiB_2$ TiC, ZrC, ZrN, VC, VN, $Al_2O_3$, $Si_3N_4$ and AlN.

11. The sintered material of claim 1, wherein the said second metal compound consists essentially of a metal compound selected from the group consisting of: WC and $W_2C$.

12. The sintered material of claim 1, wherein portions of said intermediate layer and said binder are removed to expose the interior of said core particles.

13. The sintered material of claim 1, wherein said sintered material has a fracture toughness greater than cubic boron nitride.

14. A sintered material comprising:
   a plurality of core particles, said core particles consisting essentially of a metal compound selected from the group consisting of: TiN, TiCN, $TiB_2$, TiC, ZrC, ZrN, VC, VN, $Al_2O_3$, $Si_3N_4$, and AlN;
   an intermediate layer on each of said core particles, said layer consisting essentially of a second metal compound, different in composition from said first metal compound and having a higher relative fracture toughness, said second metal compound consisting essentially of WC; and
   a binder overlaying said intermediate layer on said coated particles, said binder comprising cobalt or nickel.

15. A sintered material comprising:
   a plurality of core particles, said core particles consisting essentially of one or more subsets of particles, each of said subsets having a different formula $M_aX_b$, where M is a metal selected from the group consisting of titanium, zirconium, hafnium, vanadium, niobium, tantalum, chromium, molybdenum, tungsten, aluminum, and silicon, X represents one or more elements selected from the group consisting of nitrogen, carbon, boron and oxygen, and a and b are numbers greater than zero up to and including four,
   an intermediate layer on each of said core particles, said layer consisting essentially of a metal compound, different in composition from said plurality of said metal compounds forming said core particles and having a higher relative fracture toughness, said different metal compound being capable of bonding with said metal compounds forming said core particles and being capable of bonding with a metal selected from the group consisting of iron, cobalt, and nickel, thereby forming coated particles; and
   a binder overlaying said intermediate layer on said coated particles, said binder comprising iron, cobalt, nickel, their mixtures, their alloys, or their intermetallic compounds.

16. The sintered material of claim 15, said coated particles having an average particle size less than about 2 $\mu$m.

17. The sintered material of claim 15, said coated particles having an average particle size less than about 1 $\mu$m.

18. The sintered material of claim 15, said intermediate layer having a thickness, after sintering, in the range of from 5% to 25% of the diameter of said core particles.

19. The sintered material of claim 15, said intermediate layer having a thickness such that strain fields associated with dislocations in one coated particle are transmitted through said intermediate layer to the immediately adjacent core particle.

20. The sintered material of claim 15, said intermediate layer having a thickness, after sintering, in the range of from 3% to 200% of the diameter of said core particles.

21. The sintered material of claim 15, said outer layer having a thickness such that strain fields associated with dislocations in one coated particle are transmitted through said outer layer to the immediately adjacent intermediate layer.

22. The sintered material of claim 15, wherein said metal compounds forming said core particles consists essentially of stoichiometric compounds.

23. The sintered material of claim 15, wherein said metal compounds forming said core particles consist essentially of metal compounds selected from the group consisting of: TiN, TiCN, TiB$_2$, TiC, ZrC, ZrN, VC, VN, Al$_2$O$_3$, Si$_3$N$_4$, and AlN.

24. The sintered material of claim 15, wherein the said different metal compound consists essentially of WC.

25. The sintered material of claim 15, wherein portions of said intermediate layer and said binder are removed to expose the interior of said core particles.

26. The sintered material of claim 15, wherein said sintered material has a fracture toughness greater than cubic boron nitride.

27. A sintered material comprising:
    a plurality of core particles consisting essentially of cubic boron nitride;
    an intermediate layer on each of said core particles, said layer consisting essentially of WC, said intermediate layer having a thickness, after sintering, in the range of from 5% to 25% of the diameter of said core particles; and
    a binder comprising at least one of iron, cobalt, nickel, their mixtures, their alloys or intermetallic compounds, said binder overlaying said intermediate layer, and said binder having a thickness after sintering in the range of from 3% to 12% of the diameter of said coated particles, the combination of said core particles, said intermediate layer and said binder forming a coated particle.

28. The sintered material of claim 27, said coated particles having an average particle size less than about 1 μm.

29. A powder consisting essentially of a plurality of coated particles, the majority of said coated particles having:
    core particles consisting essentially of a first metal compound having the formula M$_a$X$_b$, where M is a metal selected from the group consisting of titanium, zirconium, hafnium, vanadium, niobium, tantalum, chromium, molybdenum, tungsten, aluminum and silicon, X represents one or more elements selected from the group consisting of nitrogen, carbon, boron and oxygen and a and b are numbers greater than zero up to and including four; and
    a layer on each of said core particles, said layer consisting essentially of a second metal compound, different in composition from said first metal compound and having a higher relative fracture toughness, said second metal compound being capable of bonding with said first metal compound and being capable of bonding with a metal selected from the group consisting of iron, cobalt and nickel.

30. The powder of claim 29, said coated particles having an average particle size of less than about 2 μm.

31. The powder of claim 29, said coated particles having an average particle size of less than about 1 μm.

32. The powder of claim 29, said layer having a thickness in the range of from 5% to 25% of the diameter of said core particles.

33. The powder of claim 29, said layer on said core particles having a thickness in the range of from 3% to 200% of the diameter of said core particles.

34. The powder of claim 29, wherein the said first metal compound consists essentially of a stoichiometric compound.

35. The powder of claim 29, wherein the said first metal compound consists essentially of a metal compound selected from the group consisting of: TiN, TiCN, TiB$_2$, TiC, ZrC, ZrN, VC, VN, Al$_2$O$_3$, Si$_3$N$_4$ and AlN.

36. The powder of claim 29, wherein the said second metal compound consists essentially of WC or W$_2$C.

37. The powder of claim 29, including an outer binder layer consisting essentially of a metal selected from the group consisting of: iron, cobalt, nickel, their mixtures, their alloys or their intermetallic compounds, said binder layer being deposited on the outer surface of said second metal compound layer in the form of a continuous layer.

38. The powder of claim 37, wherein said continuous layer of binder is deposited by chemical vapor deposition, sputtering, carbonyl deposition, solution spray electroless plating, electroplating or physical vapor deposition.

39. A powder comprising:
    a plurality of core particles consisting essentially of cubic boron nitride;
    an intermediate layer on each of said core particles, said intermediate layer consisting essentially of WC, said intermediate layer having a thickness in the range of from 5% to 25% of the diameter of said core particles; and
    an outer layer comprising cobalt or nickel overlaying said intermediate layer, the combination of said core particles, said intermediate layer, and said outer layer forming said powder.

40. The powder of claim 39, the particles comprising said powder having an average particle size less than about 1 μm.

41. A sintered material comprising:
    a plurality of core particles, said core particles consisting essentially of a metal compound selected from the group consisting of: TiN, TiCN, TiB$_2$, TiC, ZrC, ZrN, VC, VN, Al$_2$O$_3$, Si$_3$N$_4$, AlN, and mixtures thereof;
    an intermediate layer on each of said core particles said layer consisting WC; and
    a binder overlaying said intermediate layer on said coated particles, said binder comprising cobalt or nickel.

42. A sintered material comprising:
    a plurality of core particles consisting essentially of diamond and/or cubic boron nitride;
    an intermediate layer on each of said core particles, said layer consisting essentially of a metal compound having a higher relative fracture toughness than said core particles, said intermediate layer having a thickness, after sintering, in the range of from 5% to 25% of the diameter of said core particles; and
    a binder comprising at least one of iron, cobalt, nickel, their mixtures, their alloys or intermetallic compounds, said binder overlaying said intermediate layer, and said binder having a thickness after sintering in the range of from 3% to 12% of the diameter of said coated particles, the combination of said core particles, said Intermediate layer and said binder forming a coated particle.

43. The sintered material of claim 42, wherein said intermediate layer consists essentially of WC.

* * * * *

UNITED STATES PATENT AND TRADEMARK OFFICE
CERTIFICATE OF CORRECTION

PATENT NO. : 6,372,346 B1
DATED : April 16, 2002
INVENTOR(S) : Richard E. Toth

It is certified that error appears in the above-identified patent and that said Letters Patent is hereby corrected as shown below:

Column 19,
Line 59, "TiB$_2$ TiC" should read -- TiB$_2$, TiC --.

Column 20,
Line 40, after "comprising" insert -- at least one of --.
Line 64, "consists" should read -- consist --.

Column 22,
Line 38, "consisting WC" should read -- consisting essentially of WC --.
Line 57, "Intermediate" should read -- intermediate --.

Signed and Sealed this

Sixth Day of August, 2002

Attest:

JAMES E. ROGAN
Attesting Officer     Director of the United States Patent and Trademark Office